(12) United States Patent
Kim et al.

(10) Patent No.: US 9,870,193 B2
(45) Date of Patent: Jan. 16, 2018

(54) SYSTEMS, METHODS, AND DEVICES FOR ANIMATION ON TILED DISPLAYS

(71) Applicant: Hiperwall, Inc., Irvine, CA (US)

(72) Inventors: Sung-Jin Kim, Irvine, CA (US); Stephen F. Jenks, Laguna Beach, CA (US)

(73) Assignee: Hiperwall, Inc., Irvine, CA (US)

( * ) Notice: Subject to any disclaimer, the term of this patent is extended or adjusted under 35 U.S.C. 154(b) by 447 days.

(21) Appl. No.: 14/304,322

(22) Filed: Jun. 13, 2014

(65) Prior Publication Data

US 2014/0368512 A1    Dec. 18, 2014

Related U.S. Application Data

(60) Provisional application No. 61/834,716, filed on Jun. 13, 2013.

(51) Int. Cl.
*G06F 3/14* (2006.01)
*G06T 13/00* (2011.01)
*G09G 5/14* (2006.01)

(52) U.S. Cl.
CPC .......... *G06F 3/1446* (2013.01); *G06F 3/1438* (2013.01); *G06T 13/00* (2013.01);
(Continued)

(58) Field of Classification Search
None
See application file for complete search history.

(56) References Cited

U.S. PATENT DOCUMENTS

| 6,671,424 B1 * | 12/2003 | Skoll | G06T 1/60 |
| | | | 382/305 |
| 2006/0075428 A1 * | 4/2006 | Farmer | H04N 5/4401 |
| | | | 725/38 |

(Continued)

FOREIGN PATENT DOCUMENTS

| KR | 10-2007-0001771 | 1/2007 |
| KR | 10-0662425 | 1/2007 |
| KR | 10-2007-0052174 | 5/2007 |

OTHER PUBLICATIONS

Greg Humphreys, Matthew Eldridge, Ian Buck, Gordon Stoll, Matthew Everett, Pat Hanrahan, "WireGL: A Scalable Graphics System for Clusters", Aug. 17, 2001, ACM, ACM SIGGRAPH 2001.*

(Continued)

*Primary Examiner* — Robert Bader
(74) *Attorney, Agent, or Firm* — Knobbe Martens Olson & Bear LLP

(57) ABSTRACT

A display system is disclosed for animation of media objects on tiled displays. The display system can include a plurality of discrete display nodes and a control module configured to determine a graphical representation of a current state of a media object. The control module can be configured to determine a graphical representation of a future state of the media object. The control module can also be configured to determine a path area on the display nodes comprising a plurality of graphical representations of the media object during a change from the current state to the future state. The control module also can be configured to cause the display nodes overlapping with at least a portion of the path area to prepare to display the media object.

20 Claims, 16 Drawing Sheets

(52) U.S. Cl.
CPC ......... *G09G 5/14* (2013.01); *G09G 2300/026* (2013.01); *G09G 2354/00* (2013.01)

(56) References Cited

U.S. PATENT DOCUMENTS

| | | | |
|---|---|---|---|
| 2006/0181518 A1 | 8/2006 | Shen et al. | |
| 2007/0263066 A1* | 11/2007 | Henning | H04N 5/4401 348/14.01 |
| 2010/0321410 A1 | 12/2010 | Jenks et al. | |
| 2011/0199377 A1* | 8/2011 | Jang | G06T 15/20 345/426 |

OTHER PUBLICATIONS

Tomas Akenine-Moller, Jacob Munkberg, Jon Hasselgren, "Stochastic Rasterization using Time-Continuous Triangles", Aug. 5, 2007, Eurographics Association, Proceedings of the 22nd ACM SIGGRAPH/EUROGRAPHICS symposium on Graphics hardware.*

International Search Report dated Oct. 28, 2014 of PCT Application No. PCT/US2014/042295, filed Jun. 13, 2014.

\* cited by examiner

SYSTEMS, METHODS, AND DEVICES FOR ANIMATION ON TILED DISPLAYS

RELATED APPLICATIONS

The present application claims priority to U.S. Provisional Application No. 61/834,716, filed Jun. 13, 2014, the entire content of which is hereby expressly incorporated by reference.

BACKGROUND OF THE INVENTIONS

Field of the Inventions

The present inventions relate to systems, methods and devices for animation of media objects on displays, and more particularly, to the animation and display of media objects on a tiled display.

Description of the Related Art

Traditionally, personal computers and workstations are connected to one or a small number of adjacent display devices, often LCD type monitors. Such systems can provide the user with the ability to view a larger number of pixels than that typically displayable on a single monitor.

Commercially available computer systems can often support one or two monitors for each video controller (sometimes constructed in the form of a "video card") connected to the system. For example, typical "PC" computer systems include several "expansion slots" which can accept certain types of video cards. Motherboards of some "PCs" are built with one or more PCI, PCI Express, AGP, etc., slots that can accept video cards. In this manner, a single computer can be provided with multiple video cards to increase the number of displays that can be controlled by the computer. In other types of systems, each display unit of a tiled display can include a dedicated video rendering device. In some known systems, the video rendering device can be a fully functioning computer, including a commercially available operating system and video processing hardware.

SUMMARY OF THE INVENTIONS

An aspect of at least one of the inventions disclosed herein includes the realization that animation of a media object to be displayed, including the movement, zooming, stretching, rotating, etc. of a media object across a tiled display can be enhanced by determination of a predicted path on or across a tiled display of the media object as it changes states or moves across boundaries of display units or nodes forming the tiled display.

For example, when animation of a media object, such as a picture or video, results in the media object moving from a first display node to a second display node adjacent to the first display node, the second display node requires time to load the media object before display. Thus, for example, if the second display node waits until the media object is at a boundary of the second display node before the second display node begins to load the media object, the second display node may not be able to make the media object immediately visible on the second display node, resulting in a visual inconsistency as the media object moves across the boundary between the first and second display nodes.

Thus, in accordance with some embodiments disclosed herein, a display system provides for the determination of a prediction path on a tiled display of a media object as it changes from a current state to a future state. For example, when animation of a media object, such as a picture or video, results in a path in which the media object will move linearly from a first display node to a second display node adjacent to the first display node, a prediction of that path can provide advance notice that the media object will move onto second display node. As such, the second display node can begin to load the media object prior to the moment when the media object reaches the boundary of the second display node. With the media object loaded in advance, the second display node can process and display the media object so as to more fluidly continue the animation of the media object as it moves from the first to the second display node and can help avoid a loading delay or other visual inconsistency.

In some embodiments, a display system includes a plurality of discrete display nodes and a control module configured to determine a graphical representation of a current state of a media object. The control module can be configured to determine a graphical representation of a future state of the media object. The control module can also be configured to determine a path on the display nodes comprising a plurality of graphical representations of the media object during a change from the current state to the future state. The control module also can be configured to cause the display nodes overlapping with at least a portion of the path to prepare to display the media object.

In accordance with some embodiments, a method of displaying a media object on an arrayed display system including a plurality of discrete display devices disposed adjacent one another, can include determining a graphical representation on at least one of the plurality of discrete display devices of a current state of a media object, determining a graphical representation on at least one of the plurality of discrete display devices of a future state of the media object, determining a path on at least one of the plurality of discrete display devices comprising a plurality of graphical representations of the media object during a change from the current state to the future state, and preparing each of the plurality of discrete display devices overlapping with at least a portion of the path to display the media object.

In some embodiments, a computer program stored in a computer readable media and configured to cause a computer to control the display of media objects on an arrayed display system including a plurality of discrete display devices disposed adjacent one another includes a media object control module configured to determine a graphical representation on at least one of the plurality of discrete display devices of a current state of a media object. The media object control module can further be configured to determine a graphical representation on at least one of the plurality of discrete display devices of a future state of the media object. The computer program can also include a path determination module configured to determine a path on at least one of the plurality of discrete display devices comprising a plurality of graphical representations of the media object during a change from the current state to the future state. The computer program can further include a display preparation module configured to prepare each of the plurality of discrete display devices overlapping with at least a portion of the path to display the media object.

For purposes of summarizing the disclosure, certain aspects, advantages and novel features of the inventions have been described herein. It is to be understood that not necessarily all such advantages can be achieved in accordance with any particular embodiment of the inventions disclosed herein. Thus, the inventions disclosed herein can be embodied or carried out in a manner that achieves or optimizes one advantage or group of advantages as taught herein without necessarily achieving other advantages as can be taught or suggested herein.

BRIEF DESCRIPTION OF THE DRAWINGS

The above-mentioned and other features of the inventions disclosed herein are described below with reference to the drawings of preferred embodiments. The illustrated embodiments are intended to illustrate, but not to limit the inventions. The drawings contain the following Figures.

DETAILED DESCRIPTION OF SPECIFIC EMBODIMENTS

Figure 1:
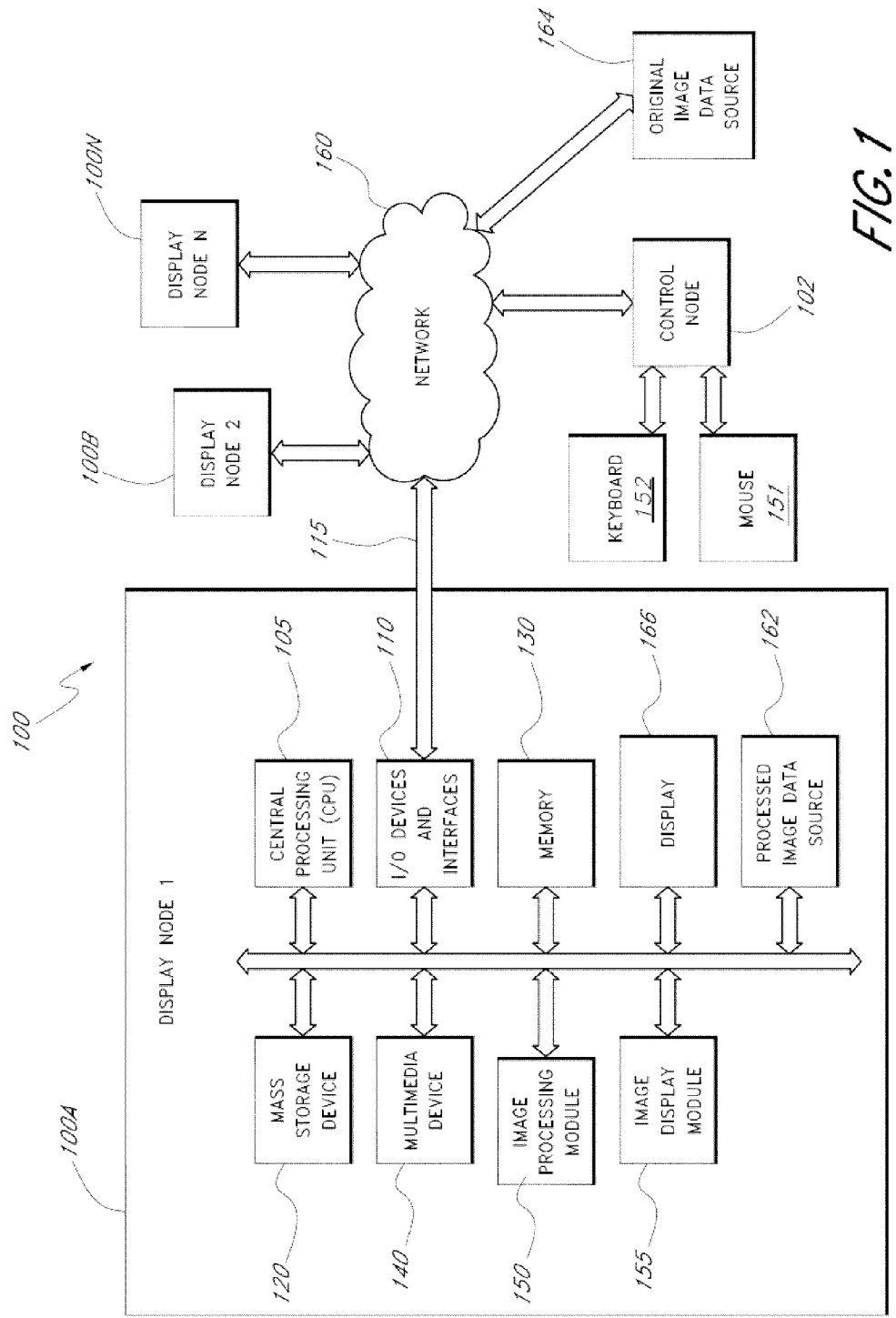
FIG. 1 is a schematic diagram illustrating an embodiment of a system for dynamic management of data streams of image data to a display array.

The present disclosure generally relates to array-type displays and animation of an image or media object, a stream of visual data, or the like on an array-type display, such as a tiled display system. As used herein, animation of a media object can refer to any combination of moving, zooming, stretching, resizing, rotating, and the like of media objects, including changes in any color parameter, such as transparency, opacity, and color. Animation of a media object can occur at any frame rate, including any frame rate used by video, such as 24 frames per second ("fps"), 30 fps, 60 fps, 120 fps, and 240 fps, as well as any other number. The term "image," as used herein, in addition to having its ordinary meaning, refers to a graphical or visual representation of any kind of media, including both still and active graphical or visual content or data, such as still image data, streaming data, video data (e.g., movies), content received using screen sender technology, applications windows (e.g., spreadsheet and word processing applications, etc.) and/or the like. In some embodiments, a system that implements a highly interactive large image or parallel display system can be used. In contrast to existing frameworks where unnecessary parts of images are displayed or loaded in the memory of a display node, some embodiments of the present systems can calculate limited portions of images to be displayed on a particular display node. This advantageously reduces the amount of data to be loaded on a particular display node, and thus increases the responsiveness of the overall tiled display. The system can thus allow updating and/or movement of images around the tiled display at a faster rate.

The term "tiled display", as used herein, refers to display systems made up of a plurality of display units positioned in a group in proximity to one another. For example, in some arrangements, and "tiled display" can include a plurality of display devices such as monitors disposed edge-to-edge so as to create a continuous or near continuous display. However, the term "tiled display" is also intended to refer to arrangements in which a group display devices are spaced apart from one another, uniformly or non-uniformly.

Some embodiments disclosed herein can allow moving, zooming, rotating, and the like of media objects such as images and other visual data, including streaming data, video data (e.g., movies), content received using screen sender technology, and/or other active content, on the tiled display, as well as other functions. Some of the embodiments described below can accommodate viewing of multiple highly detailed images, which can exceed billions of pixels, to be displayed as part of a high resolution, coordinated workspace on a tiled display. The animation of multiple image data, which can be received from multiple image data sources, can include moving, zooming, and rotating of the images more quickly and seamlessly between adjacent displays without lag. Thus the system can be beneficial for animating or visualizing various types of data, such as medical, cancer cells, satellite, geosciences, oil monitoring, weather monitoring or prediction, astronomy, and the like.

Embodiments are described below with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the inventions may include several novel features, no single one of which is solely responsible for its desirable attributes or which is essential to practicing the inventions herein described.

Some of the embodiments herein generally relate to animating a media object across a tiled array of display units, thereby allowing the display of much larger images than can be shown on a single display. Each such display unit can include a video image display, a communication mechanism, such as a network interface card or wireless interface card, and a video image controller, such as a graphics card. Attached to the tiled display may be one or more computers or other sources of video image data. A workstation may also be coupled to the tiled display and to the user computers. Each of the computers can display data or images on the tiled display simultaneously. Since the tiled display is made up of multiple display units, images from a single user computer may be on multiple, separate individual display units. The images from multiple user computers could also be shown on the same display unit and can overlap.

In some embodiments, initial connections between a source of image or video data and the tiled display can be established through a "local workstation", for example, a computer disposed in front of the tiled array. As such, a user can operate the primary workstation to control the tiled display. In other embodiments, one of the "nodes" of the tiled display can serve as the a controlling node with input devices, such as mice 151, keyboards 152, and/or touch screen devices, connected thereto for allowing a user to control the animation of images and video on the tiled display.

As described in more detail below, individual display units in the tiled display can subscribe to or connect to the image and video source, or vice versa, and therefore information can travel directly from the image and video source to the designated display unit or "node" of the tiled display. This can technique can be used to reduce the amount of bandwidth needed and the amount of computation required for each display unit.

Additionally, in some embodiments, user interaction devices such as a mouse 151, keyboard 152, or touch screen device coupled to a workstation or another other client device and can be used to control animation of images that are displayed on the tiled display.

The systems and methods described herein, along with the associated Figures, illustrate example operating environments of use. As will be described in greater detail below, these systems and methods may be implemented using computing devices other than display devices. To illustrate, in certain embodiments, the systems and methods generally provide functionality for a computing device to broker network communications between two other computing devices. For example, a control computing device could broker a connection between a media server and a destination computing device, which may be a display. Advantageously, in certain embodiments, the destination computing device and the media source device can communicate without passing any or all communication through the control computing device.

FIG. 1 is a block diagram showing of a plurality of display nodes 100A (including display nodes 100A, 100B, and 100N that are representative of any quantity of display nodes) that are in communication with a network 160 and other devices via the network 160, including an optional control node 102, which can also be referred to as a primary workstation in some embodiments. Visual data, such as video image data discussed below, can be stored in any device connected to the network, including the nodes 100N, the control node 102, or any other device. In some embodiments, original image data source 164 can be a mass storage device or computing system, also in communication with the network 160. In some embodiments, the tiled display system 100 comprises a single discrete display device (e.g., a projector or a standalone large display). In other embodiments, the tiled display system 100 comprises an array of discrete display devices or multiple arrayed display walls. In some embodiments, the tiled display system 100 comprises multiple arrayed display walls and one or more standalone display devices (e.g., "satellite" monitors).

Generally, the control node 102 can comprise one or more computing devices that gather or make available information about the state of the overall tiled display system 100, including display nodes 100, through the use of messages. For example, the control node 102 can include a desktop, laptop, tablet, netbook, handheld computing device (e.g., a smartphone or PDA), a server, or the like. In addition, the control node 102 can function as a front end interface to the tiled display system 100 that allows a user to interact with the overall system 100 by manipulating the parallel display, for example.

Any of the display nodes 100N and control node 102 can be used to implement certain systems and methods described herein. For example, in some embodiments, the display node 100A and control node 102 can be configured to manage the display of information on tiled display systems. The functionality provided for in the components and modules of the display node 100A and control node 102 can be combined into fewer components and modules or further separated into additional components and modules.

In some embodiments, the display node 100A can include, for example, a computing device, such as a personal computer that is IBM, Macintosh, or Linux/Unix compatible. In some embodiments, the computing device comprises a server, a laptop computer, a cell phone, a personal digital assistant, a kiosk, or an audio player, for example.

With continued reference to FIG. 1, although only exemplary components of the display node 100A are described in detail, it is to be understood that the descriptions of the display node 100A set forth herein also apply to the other nodes 100B, 100N.

In some embodiments, the display node 100A can include a central processing unit ("CPU") 105, which can include one or more microprocessors, graphics processors, digital signal processors, or the like. The display node 100A can further include a memory 130, such as random access memory ("RAM") for temporary storage of information and a read only memory ("ROM") for permanent storage of information, and a mass storage device 120, such as one or more hard drive, diskette, and/or optical media storage device. Typically, the modules of the display node 100A are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The display node 100A can be controlled and coordinated by operating system software, such as Windows 95, Windows 98, Windows NT, Windows 2000, Windows XP, Windows Vista, Linux, SunOS, Solaris, a real-time operating system (RTOS), or other compatible operating systems. In Macintosh systems, the operating system may be any available operating system, such as MAC OS X. In other embodiments, the display node 100A can be controlled by a proprietary operating system. The operating systems can control and schedule computer processes for execution, perform memory management, provide file system, networking, and I/O services, and provide a user interface, such as a graphical user interface ("GUI"), among other things.

The exemplary display node 100A can include one or more commonly available input/output (I/O) devices and interfaces 110, such as a keyboard, mouse, touchpad, touch screen device, and printer. In addition, display node 100A can include one or more display devices 166, such as a monitor, that allows the visual presentation of data, such as the image data described herein, to a user. More particularly, a display device provides for the presentation of scientific data, GUIs, application software data, and multimedia presentations, for example. The display node 100A can also include one or more multimedia devices 140, such as speakers, video cards, graphics accelerators, and microphones, for example.

In some embodiments, the I/O devices and interfaces 110 can provide a communication interface to various external devices. The display node 100A can be coupled to a network 160 that comprises one or more of a LAN, WAN, or the Internet, for example, via a wired, wireless, or combination of wired and wireless, communication link 115. The network 160 communicates with various computing devices and/or other electronic devices via wired or wireless communication links.

In the embodiment of FIG. 1, display node 100A can include, or may be coupled to via a network connection, to a processed image data source 162, such as a database, that includes information about one or more images to display. The information supplied by the processed image data source 162 can include a full size or original image that was or will be preprocessed and stored in a hierarchical format that includes sub-images, with each sub-image being a reduced size version of the original image. For example, a reduced resolution sub-image can be generated from an original full resolution image by deleting rows and columns of the pixels of the original image at predetermined spacings, thereby generating a lower resolution version of the full image. Any other known technique can also be used. The processed image data source 162 can serve as a video image data source, as used in the description set forth herein.

In some embodiments, the largest sub-image can be the same size as the original image and/or include image content from the original image. For example, each sub-image can be stored as one or more blocks to allow rapid access to a particular part of the original image without having to access entire rows. Of note, this can allow display node 100A to fetch exactly the level of detail (sub-image) it requires and/or to quickly fetch the needed blocks that make up the image tile to be placed on display 166. In addition to the devices that are illustrated in FIG. 1, display node 100A can be connected to original image data source 164 or computing devices through a bus or network 160.

Original image data source 164 can include one or more original or full size images that can be tens or hundreds of millions of pixels, or even billions of pixels. In some embodiments, display node 100A can preprocess the original images stored in original image data source 164, store the result in a hierarchical format in processed image data source 162, calculate the correct portion of original images to be displayed on a particular display node 100, and/or display the corresponding preprocessed image data. Thus, the processed image data source 162 can be used to reduce the amount of data that needs to be loaded in memory and support faster manipulation and animation of images.

Of note, the original images stored in original image data source 164 can be compressed or uncompressed images. In some embodiments, the processed image data source 162 can also be configured to receive a compressed image from the original image data source 164. Once received, display node 100A can decompress an original image and then preprocess the original image into a set of one or more images that are compressed or decompressed and store them in the processed image data source 162. Spatial identifiers can be used to identify various portions of the images to facilitate extraction of different regions of the original image.

In some embodiments, one or more of the data sources may be implemented using a relational database, such as Sybase, Oracle, CodeBase and Microsoft® SQL Server as well as other types of databases such as, for example, a flat file database, an entity-relationship database, an object-oriented database, and/or a record-based database.

With continued reference to FIG. 1, in some embodiments the display node 100A can also include application modules that can be executed by the CPU 105. In some embodiments, the application modules include the image processing module 150 and image display module 155, which are discussed in further detail below. These modules can include, by way of example, hardware and/or software components, such as software components, object-oriented software components, class components and task components, processes, functions, attributes, procedures, subroutines, segments of program code, drivers, firmware, microcode, circuitry, data, databases, data structures, tables, arrays, and variables.

In some of the embodiments described herein, each display node 100A can be configured to execute instructions in the image processing module 150, among others, in order to support user interactivity by reducing the amount of data loaded into memory when an image is to be displayed on the tiled display system. In addition, image processing module 150 can be configured to allow portions of several images to be resident on each display 166, thus supporting display and animation of multiple big or original images across multiple display nodes 100. For example, in some embodiments, an original image can be tens of billions of pixels. Image processing module 150 can preprocess and store in a hierarchical format multiple full size or original images by calculating the correct portion of the original images to be displayed on a specific display node 100.

In certain embodiments, each original image can be stored in a hierarchical format that includes sub-images that can be reduced size or reduced resolution versions of the original image. In some embodiments, the largest sub-image can be the same size as the original image and/or include image content from the original image to support zoom in and/or out, for example. Image processing module 150 can then store each sub-image of the original image as one or more blocks to allow rapid access to a particular part of the full size image without having to access entire rows or columns. This can advantageously allow a display node 100A that knows which portion of the original image is needed for its display 166 to fetch the level of detail needed, such as a sub-image and/or to quickly fetch the needed blocks that make up the image tile.

Image processing module 150 can be further configured to send requests to control node 102 for information about other display nodes (e.g., 100B, 100c, etc.) and/or vice versa. In some embodiments, messages can be exchanged between control node 102 and/or other display nodes that include information about the state of the aggregate tiled display, or a particular display node 100A, 100B, 100C, etc. The image processing module 150 and/or the control node 102 may communicate the messages using a web service or using proprietary protocols.

Display node 100A can also execute instructions in image display module 155 to display one or more images or portions thereof and animate the images. As noted above, an original image that is full size can be preprocessed by image processing module 150 and then stored in processed image data source 162. Because the amount of data loaded into memory 130 can be reduced when an original image is stored in hierarchical format, image display module 155 can enable a highly interactive display space that spans multiple display nodes 100.

For example, image display module 155 can load the appropriate sub-image of an original image in memory 130 and on display 166. In some embodiments, surrounding blocks and blocks from higher and lower levels can also be pre-fetched for higher performance by image display module 155. This may allow each display node 100A to support the display of more than one such image or portions thereof. Additionally, a resource management approach can support interactivity by reducing the amount of data loaded and allowing portions of several images to be resident on each tile, thus supporting display and manipulation of multiple big images.

Advantageously, image display module 155 can be configured to allow the use of multiple highly detailed image data, which can exceed billions of pixels, to be displayed as part of a high resolution, coordinated workspace on a tiled display that includes multiple display nodes 100. Further, image display module 155 allows animation with multiple images by allowing moving, zooming, rotating, color filtering, and transparency controlling of images on display node 100.

In addition, image display module 155 may also exchange messages with control node 102 or other display nodes 100A about the state of the tiled display, such as which portion of the original image are to be displayed by respective nodes. Thus image display module 155 can provide a highly interactive experience that has numerous applications, including the manipulation of data about medical conditions, cancer cells, satellite images, geosciences, oil monitoring, weather monitoring or prediction, astronomy, video gaming, and the like.

Although FIG. 1 has been described with respect to display nodes 100, a control node 102, and an image data source 164, certain of the features of the system shown in FIG. 1 can be implemented using other types of computing devices communicating over the network 160. For example, the control node 102 can communicate over the network 160 with a media source device (instead of the image data source 164) and one or more destination computing devices (instead of the display nodes 100).

The control node 102 can broker a connection between the media source device and a destination computing device. In one embodiment, the control node 102 locates media data stored on the media source device and obtains the media data or a portion thereof (such as a thumbnail) from the media source device. The control node 102 may then send the media data or the portion thereof to the destination computing device, along with network communication or connectivity data. The network communication data can enable the destination computing device to communicate with the media source device to obtain media data. The network communication data could include, for example, a network address (such as an IP address) of the media source device, a proxy for the media source device, an anycast IP address for a plurality of media source devices, or the like.

Advantageously, in certain embodiments, providing the network communication data from the control node 102 to the destination computing device enables the destination computing device to obtain media, including media updates, from the media source device. As a result, the control node 102 can be less of a bottleneck for communications between the media source device and the destination computing device.

In an embodiment, the destination computing device can report or otherwise provide the media updates it receives or a portion thereof to the control node 102. For example, the destination computing device can provide a thumbnail, a reduced frame rate video, metadata associated with the media updates, combinations of the same, and the like. The control node 102 can therefore keep track of the media data provided to the destination control device.

In another embodiment, the control node 102 can provide network communication information to the media source device instead of or in addition to providing communication information to the destination computing device. This network communication information can allow the media source device to communicate with the destination computing device. For example, the control node 102 can provide a network address of the destination computing device to the media source device. The media source device can then push media to the destination computing device.

In still another embodiment, the control node 102 can identify media stored on the media computing device without requesting the media. The control node 102 can provide network communication data to the destination computing device, which allows the destination computing device to obtain the media from the media server. Thus, little or no media might pass through the control node 102 from the media source device to the destination computing device, further reducing bottleneck effects of the control node 102.

Figure 2:
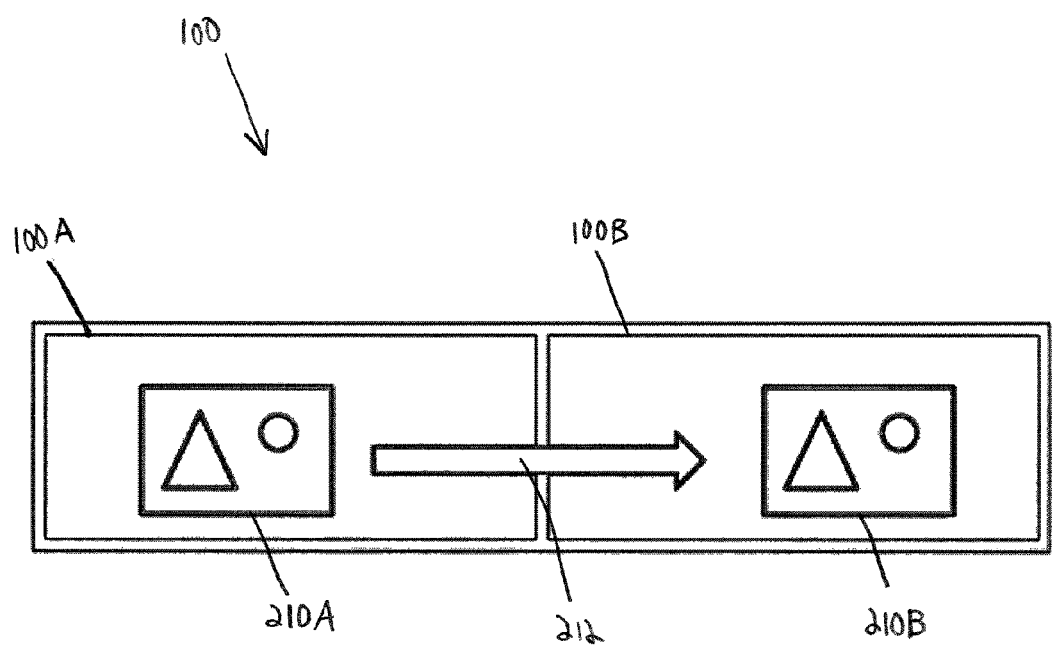
FIG. 2 is a schematic representation of a media object being moved from a first display node to a second display node.

FIG. 2 schematically depicts an example of how a media object can be moved from a first display node to a second display node. For example, a tiled display system 100 can comprise a first display node 100A and a second display node 100B. A media object 210A, such as an image, video, or live stream, is displayed in an initial state on the first display node 100A. A linear movement animation, as depicted by the arrow 212, indicates that the media object in an initial state 210A is moved from its position on the first display node 100A to the media object in a final state 210B in a position on the second display node 100B. The linear movement of position of the media object from initial state 210A to final state 210B can be animated over a time period of five seconds, for example.

FIGS. 3A-3E schematically illustrate snapshots at different times of the media object of FIG. 2 as it is moved from the first display node 100A to the second display node 100B of the tiled display system 100. The snapshots illustrate problems that can arise in displaying movement of the media object across adjacent displays if a predictive path is not determined. In some embodiments, the predicted path is a path area, an area which is swept by the media object as it moves.

Figure 3:
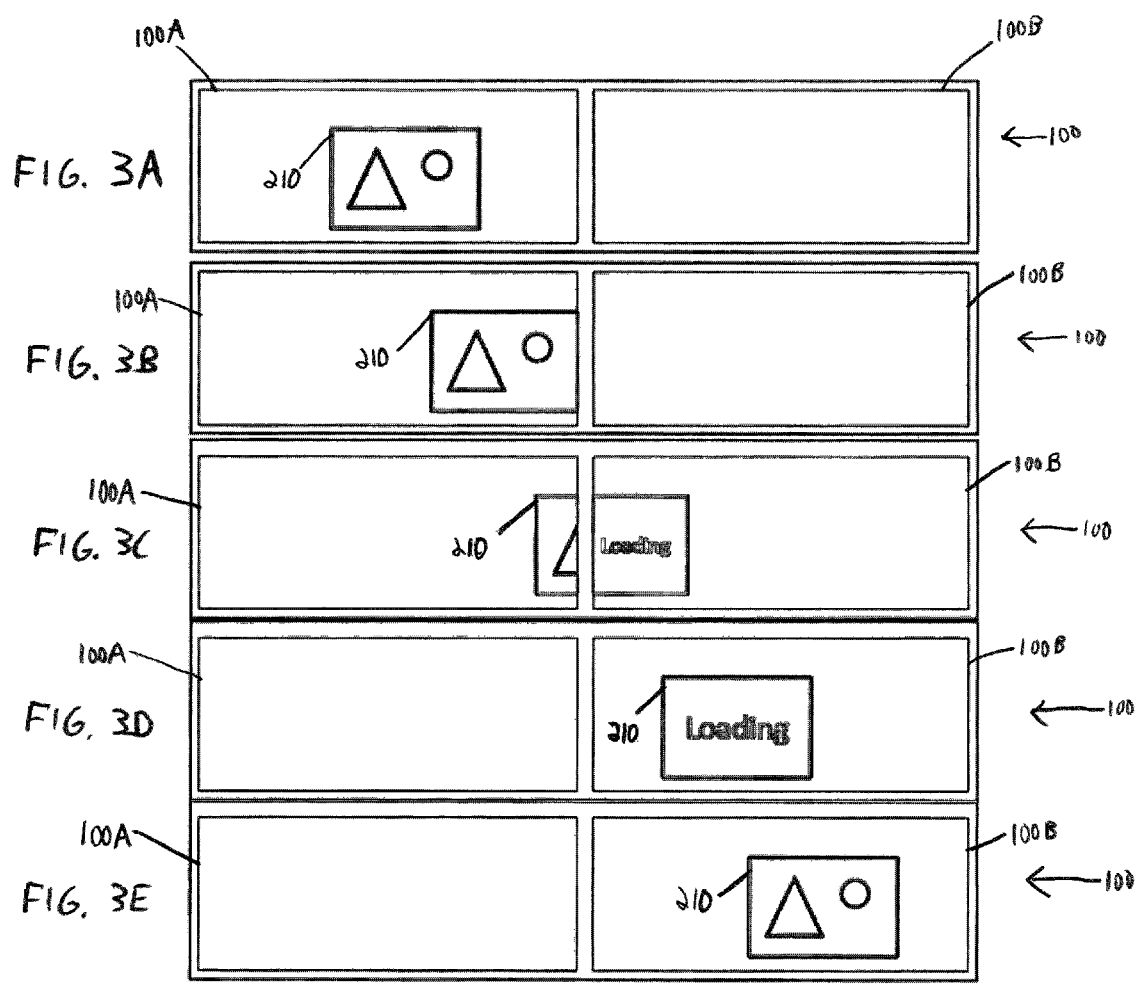
FIGS. 3A-3E schematically illustrate snapshots at different times of a media object being moved from a first display node to a second display node.

For example, at an initial time in FIG. 3A, the media object is displayed entirely within the first display node 100A before it begins a linear movement animation in a right direction. At a subsequent time shown in FIG. 3B, the media object still is displayed entirely within the first display node 100A, but a right edge of the media object 210 is at a boundary between the first display node 100A and the second display node 100B. At a later time shown in FIG. 3C, the animation intends to display a right portion of the media object 210 on the second display node 100B, but a delay while the second display node 100B loads the media object 210 results in nothing being displayed on the second display node 100B.

For example, if the media object is an image, a loading delay from a mass storage device can be approximately one to two seconds. If the media object is a video, a loading delay from a mass storage device can be approximately two to four seconds. Alternatively, if the media object is a live video stream, establishing a network connection between the display node and the source of the live stream can take approximately one to two seconds or more. So, at the time in FIG. 3C, only a left portion of the media object 210 is displayed on the first display node 100A, resulting in visual inconsistency for a viewer. At a later time shown in FIG. 3D, the animation intends to display the media object entirely in the second display node 100B, but the second display node 100B is still loading the media object 210. As a result, the media object 210 is not displayed at the time shown in FIG. 3D. Lastly, at FIG. 3E, the second display node 100B has finished loading the media object 210 and displays it.

FIGS. 4A-4E schematically illustrate snapshots at different times of the media object of FIG. 2 as it is moved from the first display node 100A to the second display node 100B of the tiled display system 100. The snapshots illustrate an example of an embodiment for displaying movement of the media object across adjacent displays if a predictive path area is determined. A predictive path area can also be referred to as a look-ahead boundary. For example, at an initial time in FIG. 4A, the media object is displayed entirely within the first display node 100A before it begins a linear movement animation in a right direction. However, a control module is aware of a predictive path area 220 on the first and second display nodes 100A and 100B that will be traced by the media object 210 as it changes from the initial state to a future state. In some embodiments, the predictive path area 220 is determined up to a future time approximately two seconds past the current time. In other embodiments, the predictive path area 220 is determined up to a future time up to four or more seconds past the current time. The second display node overlaps with a portion of the predictive path area 220, so the second display node can begin loading the media object at the initial time for later display at the future time. At a subsequent time shown in FIG. 4B, the media object still is displayed entirely within the first display node 100A, but a right edge of the media object 210 is at a boundary between the first display node 100A and the second display node 100B. As shown, the control module has updated the predictive path area 220, which at this time overlaps only with the second display node 100B. The second display node 100B continues loading the portion of the predictive path area 220 for the media object 210 that it had begun loading at the time in FIG. 4A and begins loading the remaining portion of the predictive path area 220. At a later time shown in FIG. 4C, the animation of the media object 210 can continue seamlessly from the first display node 100A to the second display node 100B because the second display node 100B has already completed loading of the media object 210 by the time the right edge of the media object 210 first appears on the display node 100B. In addition, the second display node 100B updates the predictive path area 220 and continues loading the media object 210. At a later time shown in FIG. 4D, all of the media object 210 is displayed on the second display node 100B. The size of the predictive path area 220 is smaller in FIG. 4D because the media object 210 has less remaining position to traverse before reaching a final position. Lastly, at FIG. 4E, the second display node 100B displays the media object 210 at the final position of the animation.

Figure 4:
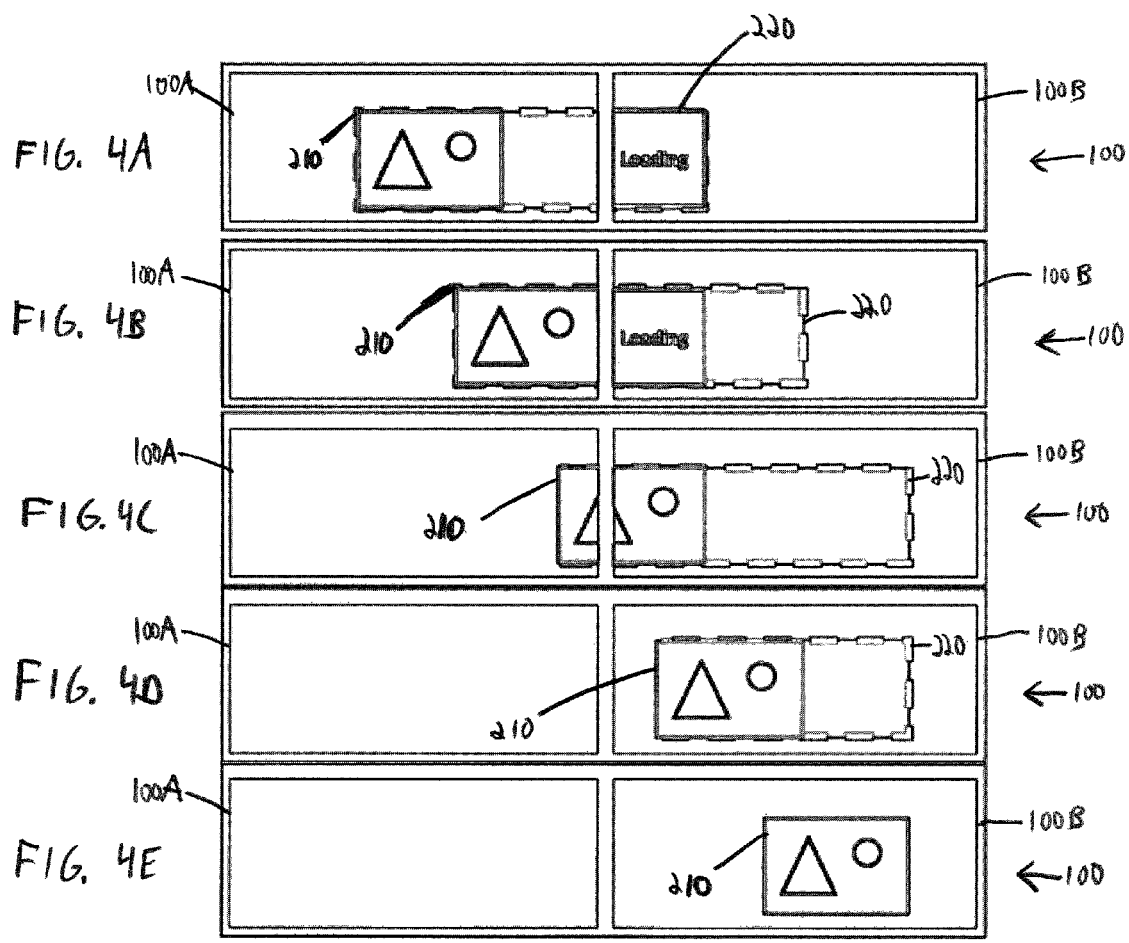
FIGS. 4A-4E schematically illustrate snapshots at different times of a media object being moved through a path from a first display node to a second display node.

As illustrated in FIGS. 4B-4D, in this example, at least three intermediate positions of the media object 210 are determined between the initial position of the media object 210 in FIG. 4A and the future position of the media object 210 in FIG. 4E. The number of intermediate positions of the media object 210 that can be determined by a control module between any initial position and future position can be any number, including more or less than three. In some embodiments, the number of intermediate positions that are determined by a control module may depend on the frame rate of the animation. In an animation, the initial and final state of a media object, including position, can be referred to as key frames.

Figure 5:
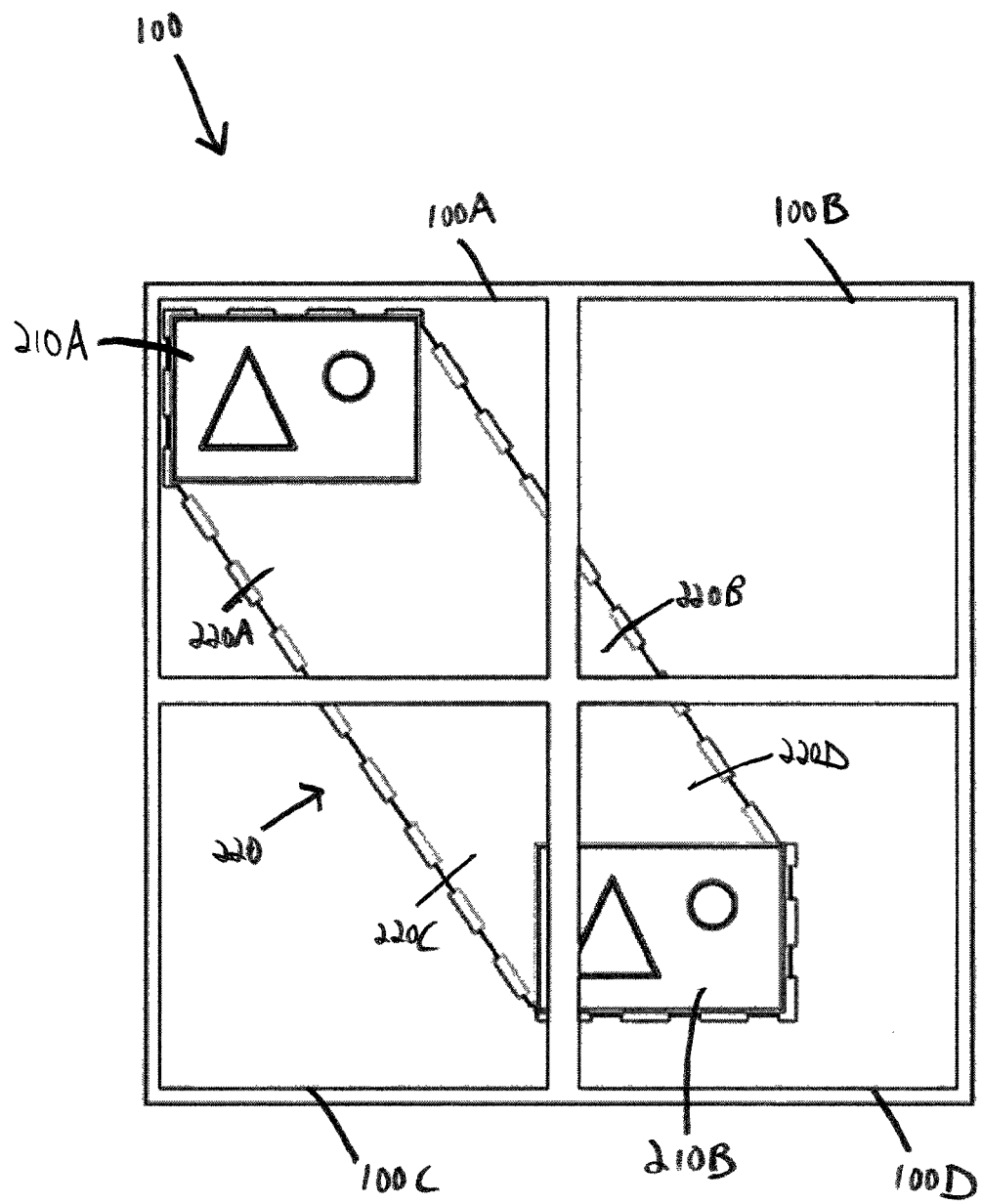
FIG. 5 is a schematic representation of a media object being moved from a first display node through a path including portions of a second, third, and fourth display node.

FIG. 5 schematically depicts an example of how a media object can be moved from a first display node through a second, third, and fourth display node. For example, a tiled display system 100 can comprise a first display node 100A, a second display node 100B, a third display node 100C, and a fourth display node 100D. A media object, such as an image, video, or live stream, is displayed in an initial state on the first display node 100A. A linear movement animation of the media object from an initial position at 210A to a final position at 210B traces out a path area 220. A portion 220A of the path area 220 overlaps with the first display node 100A. Another portion 220B of the path area 220 overlaps with the second display node 100B. Another portion 220C of the path area 220 overlaps with the third display node 100C. Another portion 220D of the path area 220 overlaps with the fourth display node 100D. Because the predicted path area 220 overlaps with each of the first, second, third, and fourth display nodes 100A, 100B, 100C, and 100D, each of the first, second, third, and fourth display nodes 100A, 100B, 100C, and 100D is configured to begin loading the media object before a future time for display.

Figure 6A:
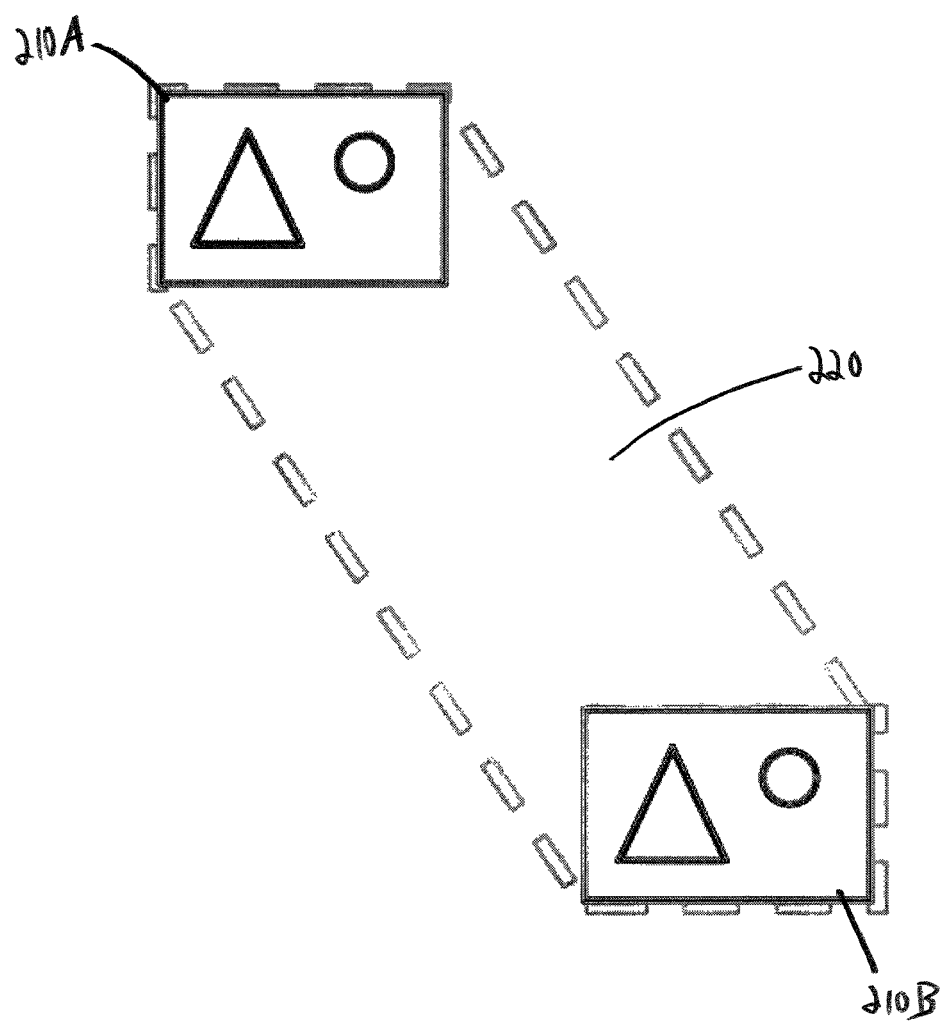
FIG. 6A is a schematic representation of a path of a media object as it is moved linearly.
Figure 6B:
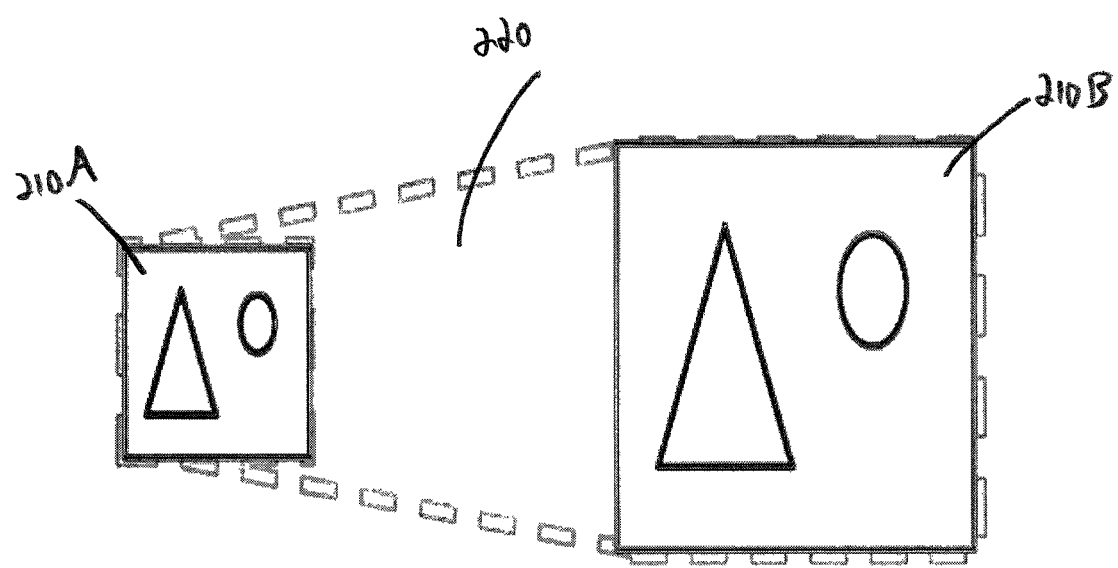
FIG. 6B is a schematic representation of a path of a media object as it is moved linearly and resized.
Figure 6C:
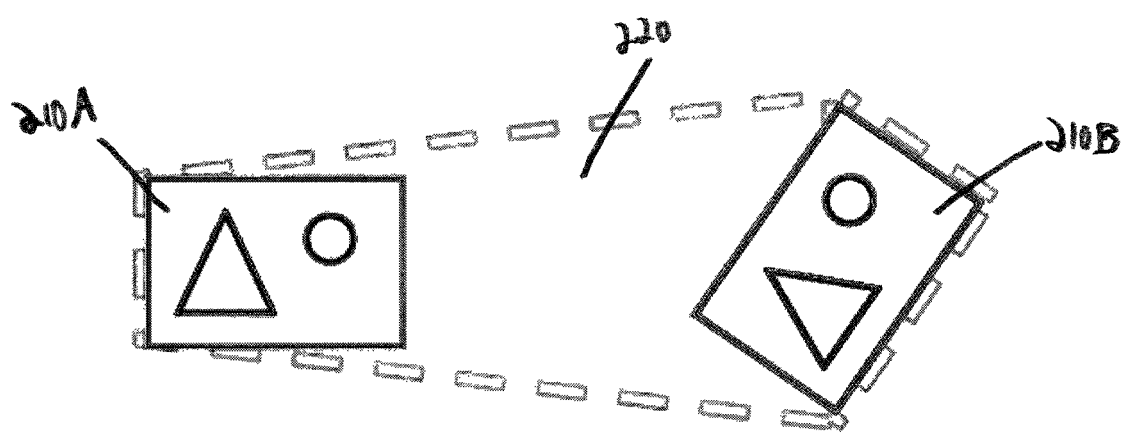
FIG. 6C is a schematic representation of a path of a media object as it is moved linearly and rotated.

FIGS. 6A-6C illustrates schematic representations of a path area of a media object as it undergoes different animations. The animations should be understood to occur on any number of display nodes. For example, FIG. 6A is a schematic representation of an example of a path area of a media object as it is moved linearly. An animation of a media object from an initial position at 210A to a final position at 210B can trace out a path area 220.

FIG. 6B is a schematic representation of an example of a path area of a media object as it is moved linearly and resized. For example, an animation of a media object from an initial position at 210A to the right to a final position at 210B and simultaneously increased in size can trace out a path area 220.

FIG. 6C is a schematic representation of an example of a path area of a media object as it is moved linearly and rotated. For example, an animation of a media object from an initial position at 210A to the right to a final position at 210B and simultaneously rotated counter-clockwise can trace out a path area 220.

The path areas 220 depicted in FIGS. 6A-6C include every display point traversed by the media object in changing from an initial state at 210A to a final position at 210B. As shown, in these embodiments, only the display points predicted to be traversed by the media object are included in the path area 220, and display points not predicted to be traversed by the media object are not included in the path area 220. Advantageously, this example provides an exact path area description to eliminate any guesswork by each of the display nodes in determining whether the path area overlaps. A drawback is that additional information is required to represent the path area when the boundary of the path area is relatively complex, such as when the boundary of the path area comprises diagonal boundary lines.

Figure 7A:
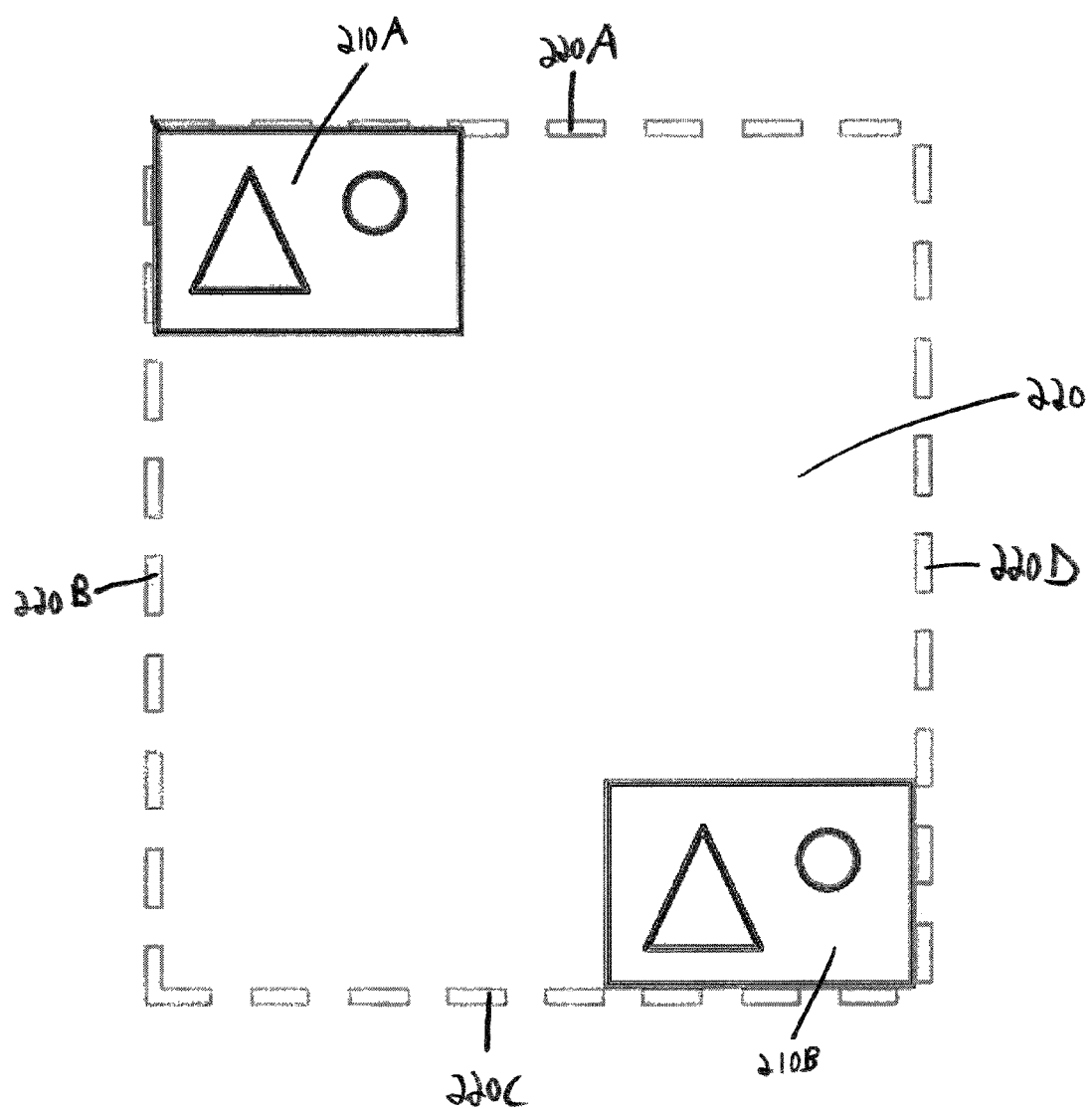
FIG. 7A is a schematic representation of a simplified path of the media object of FIG. 6A as it is moved linearly.
Figure 7B:
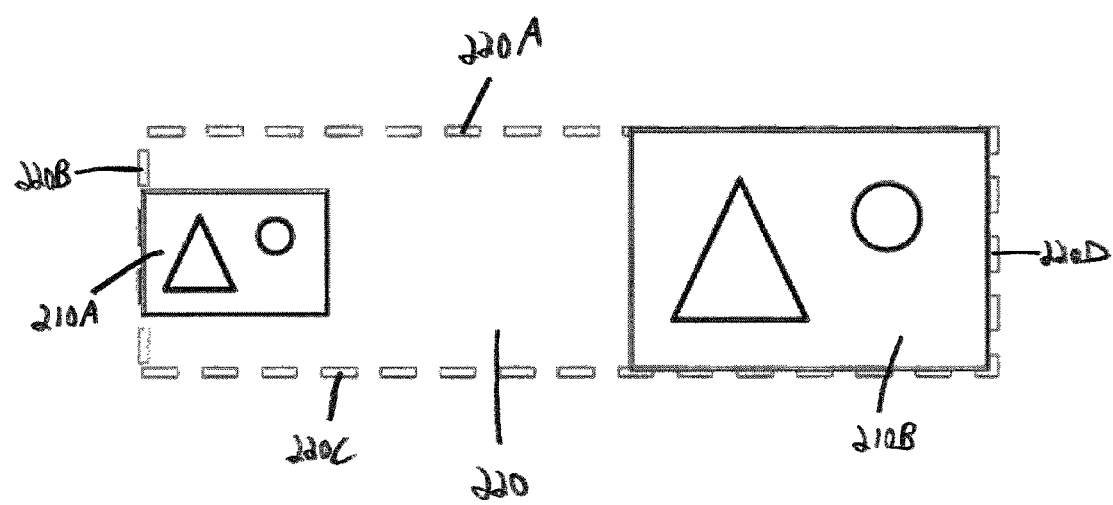
FIG. 7B is a schematic representation of a simplified path of the media object of FIG. 6B as it is moved linearly and resized.
Figure 7C:
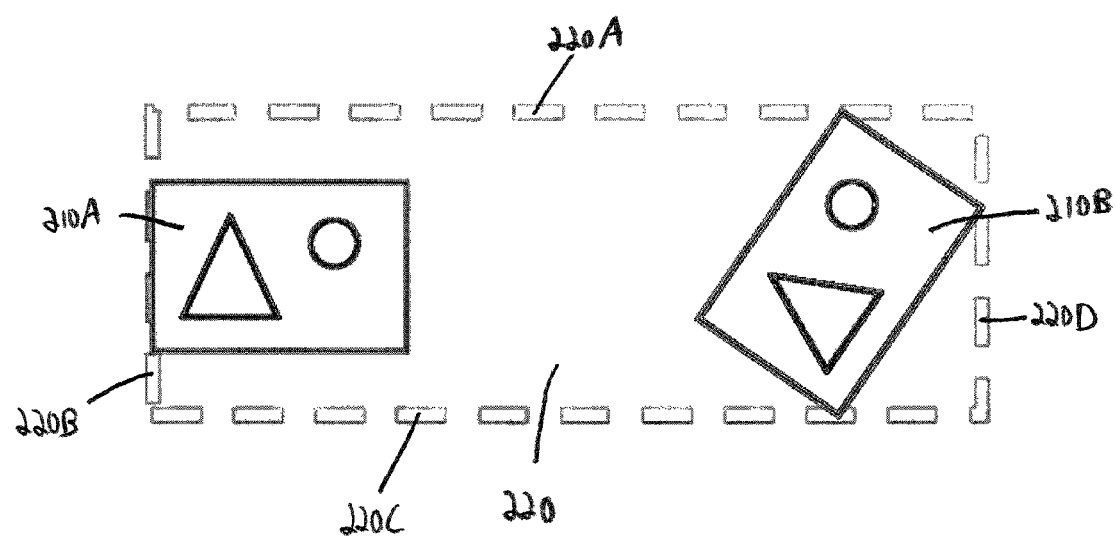
FIG. 7C is a schematic representation of a simplified path of the media object of FIG. 6C as it is moved linearly and rotated.

FIGS. 7A-7C illustrates schematic representations of simplified path areas corresponding to the path areas illustrated in FIGS. 6A-6C of a media object as it undergoes different animations. The animations should be understood to occur on any number of display nodes. For example, FIG. 7A is a schematic representation of an example of a simplified path area of a media object as it is moved linearly. An animation of a media object from an initial position at 210A to a final position at 210B can trace out an area included within rectangular path area 220. To specify the rectangular path area 220, a control module may only require four numbers corresponding to a top point 220A, a left point 220B, a bottom point 220C, and a right point 220D. For example, the top point 220A can correspond to the point furthest to the top on the plurality of discrete display nodes that includes any graphical representation of the media object during the change from the initial state 210A to the future state 210B. The left point 220B can correspond to the point furthest to the left on the plurality of discrete display nodes that includes any graphical representation of the media object during the change from the initial state 210A to the future state 210B. The bottom point 220C can correspond to the point furthest to the bottom on the plurality of discrete display nodes that includes any graphical representation of the media object during the change from the initial state 210A to the future state 210B. The right point 220D can correspond to the point furthest to the right on the plurality of discrete display nodes that includes any graphical representation of the media object during the change from the initial state 210A to the future state 210B.

FIG. 7B is a schematic representation of an example of a simplified path area of a media object as it is moved linearly and resized. For example, an animation of a media object from an initial position at 210A to the right to a final position at 210B and simultaneously increased in size can trace out a simplified rectangular path area 220. The simplified rectangular path area 220 can be bounded by a top point 220A, a left point 220B, a bottom point 220C, and a right point 220D.

FIG. 7C is a schematic representation of an example of a path area of a media object as it is moved linearly and rotated. For example, an animation of a media object from an initial position at 210A to the right to a final position at 210B and simultaneously rotated counter-clockwise can trace out a simplified path area 220. The simplified rectangular path area 220 can be bounded by a top point 220A, a left point 220B, a bottom point 220C, and a right point 220D.

The simplified rectangular path areas 220 depicted in FIGS. 7A-7C include more display points than the display points traversed by the media object in changing from an initial state at 210A to a final position at 210B. Accordingly, not every display point included in the simplified rectangular path area 220 corresponds to a display point traversed by the media object 210. Advantageously, this embodiment facilitates simple communication of path areas to the plurality of display nodes. A drawback is that when a display node determines overlap between itself and a simplified rectangular path area 220, the display node cannot be certain whether the display node is intended to display the media object at a future time. Accordingly, when a display node determines overlap between itself and a simplified rectangular path area 220, the display node begins to load the media object for display, but the display node does not display the media object unless it determines that the true path area of the media object overlaps with the display node.

Figure 8:
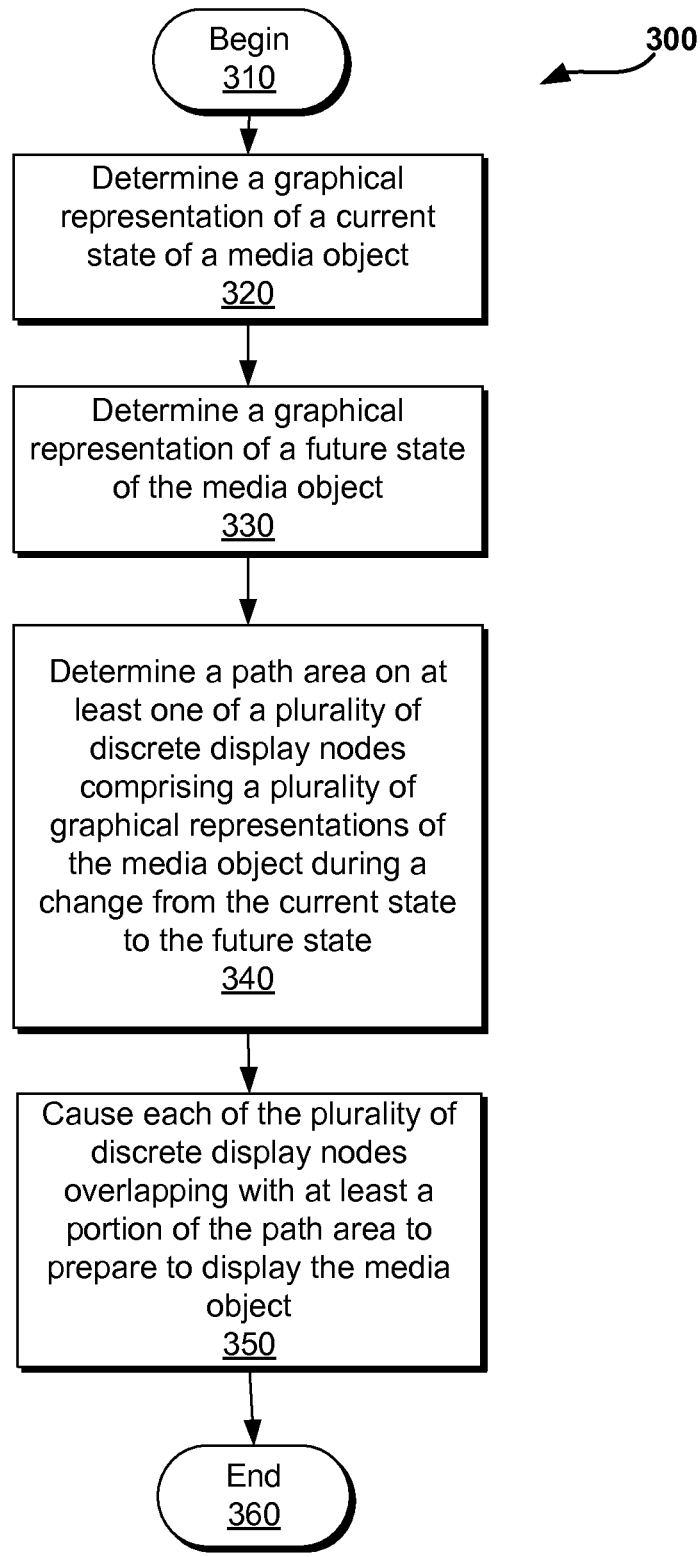
FIG. 8 is a flow chart illustrating an embodiment of a method for animating a media object on an array display.

FIG. 8 is a flow chart illustrating an embodiment of a method 300 for animating a media object on an array display. The method illustrated in FIG. 8, as well as the other methods disclosed below, can be stored as process instructions (for example on any type of computer-readable storage medium) accessible by the image processing module 150 and/or other components of the display node 100A, the control node 102, or any other computer or system connected to the array 100 directly or over any type of network. Depending on the embodiment, certain of the blocks described below may be removed, others may be added, and the sequence of the blocks may be altered. The blocks of the methods and algorithms described in connection with the embodiments disclosed herein can be embodied directly in hardware, in a software module executed by a processor, or in a combination of the two.

Beginning in block 310 and proceeding to block 320, the method includes determining a graphical representation of a current state of the media object. For example, the current state can comprise a graphical representation of the media object on at least one of the plurality of discrete display nodes. Moving to block 330, a graphical representation of a future state of the media object can be determined. For example, the future state can comprise a graphical representation of the media object on at least one of the plurality of discrete display nodes.

Moving to block 340, a path area on at least one of the plurality of discrete display nodes comprising a plurality of graphical representations of the media object during a change from the current state to the future state can be determined. At block 350, each of the plurality of discrete display devices overlapping with at least a portion of the path area determined in 340 can be caused to prepare to display the media object. For example, each of the plurality of discrete display devices overlapping with at least a portion of the path area can begin to load the media object.

Figure 9:
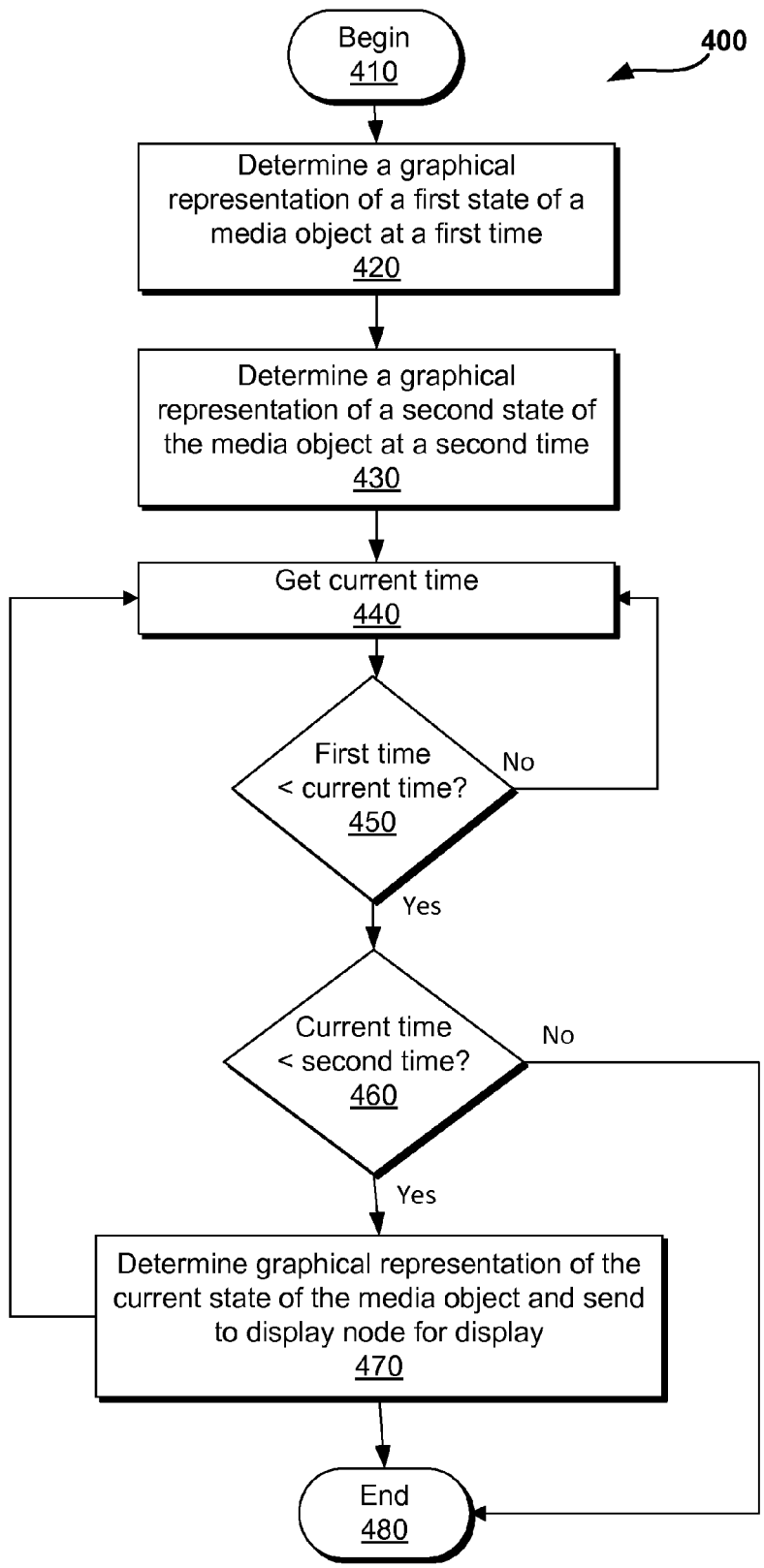
FIG. 9 is a flow chart illustrating an embodiment of a method that can be practiced by a control node for animating a media object on an array display.

FIG. 9 schematically illustrates an embodiment of another method 400 of animating images on a tiled display system, such as the array 100. The method illustrated in FIG. 9, as well as the other methods disclosed below, can be stored as process instructions (for example on any type of computer-readable storage medium) accessible by the image processing module 150 and/or other components of the display node 100A, the control node 102, or any other computer or system connected to the array 100 directly or over any type of network. Depending on the embodiment, certain of the blocks described below may be removed, others may be added, and the sequence of the blocks may be altered. The blocks of the methods and algorithms described in connection with the embodiments disclosed herein can be embodied directly in hardware, in a software module executed by a processor, or in a combination of the two.

Beginning in block 410 and proceeding to block 420, the method includes determining a graphical representation of a first state of a media object at a first time. For example, the first state can comprise a graphical representation of the media object on at least one of the plurality of discrete display nodes. Moving to block 430, a graphical representation of a second state of the media object at a second time can be determined. For example, the second state can comprise a graphical representation of the media object on at least one of the plurality of discrete display nodes.

At block 440, the current time can be obtained. Moving on to block 450, the current time is compared to the first time. If the first time is not before the current time, the animation sequence has not yet begun, and the routine returns to block 440. After the current time is at or after the first time, the method continues to block 460. If the current time is before the second time, the method continues to block 470 and a graphical representation of the current state of the media object is determined and sent to at least one display node for display. In this example, a prediction path area is not used.

If the current time is beyond the second time, the media object is in the second state, and the routine ends at 480.

Figure 10:
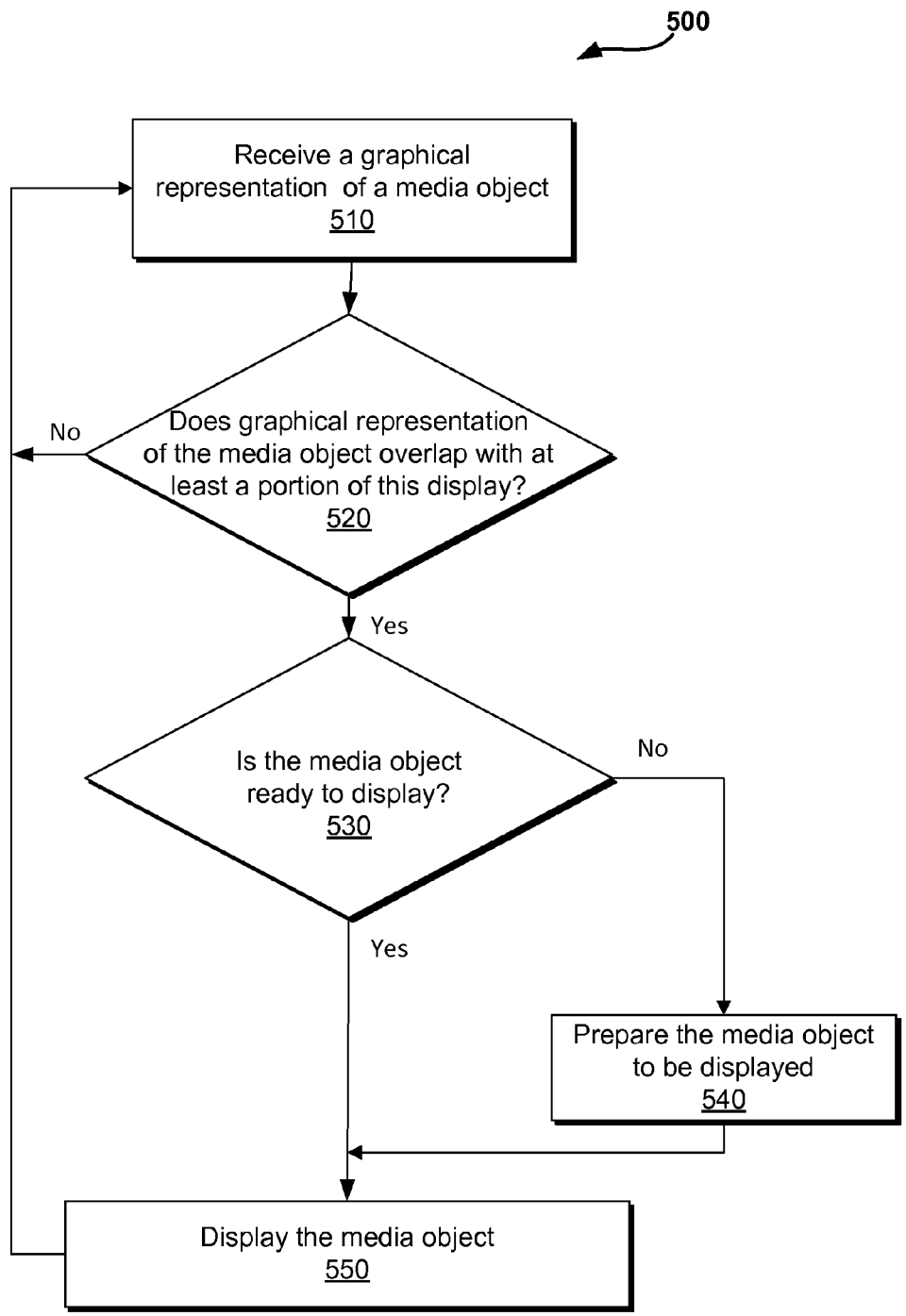
FIG. 10 is a flow chart illustrating an embodiment of a method that can be practiced by a display node for animating a media object on an array display.

FIG. 10 schematically illustrates an embodiment of another method 500 of animating images on a tiled display system, such as the array 100. The method illustrated in FIG. 10, as well as the other methods disclosed below, can be stored as process instructions (for example on any type of computer-readable storage medium) accessible by the image processing module 150 and/or other components of the display node 100A, the control node 102, or any other computer or system connected to the array 100 directly or over any type of network. Depending on the embodiment, certain of the blocks described below may be removed, others may be added, and the sequence of the blocks may be altered. The blocks of the methods and algorithms described in connection with the embodiments disclosed herein can be embodied directly in hardware, in a software module executed by a processor, or in a combination of the two.

Beginning in block 510, a graphical representation of a media object is received. Proceeding to block 520, a display node can determine whether the graphical representation of the media object overlaps with at least a portion of the display node. If not, the display node does not need to display the media object, and the routine can return to block 510. If the answer in block 520 is yes, the display node needs to display the media object. Proceeding to block 530, the display node determines whether the media object is ready for display. If yes, the display node can display the media object immediately at block 550. If not, the display node can proceed to block 540 to prepare the media object to be displayed by loading the media object. Once loaded, the display node can proceed to block 550 and display the media object.

Figure 11:
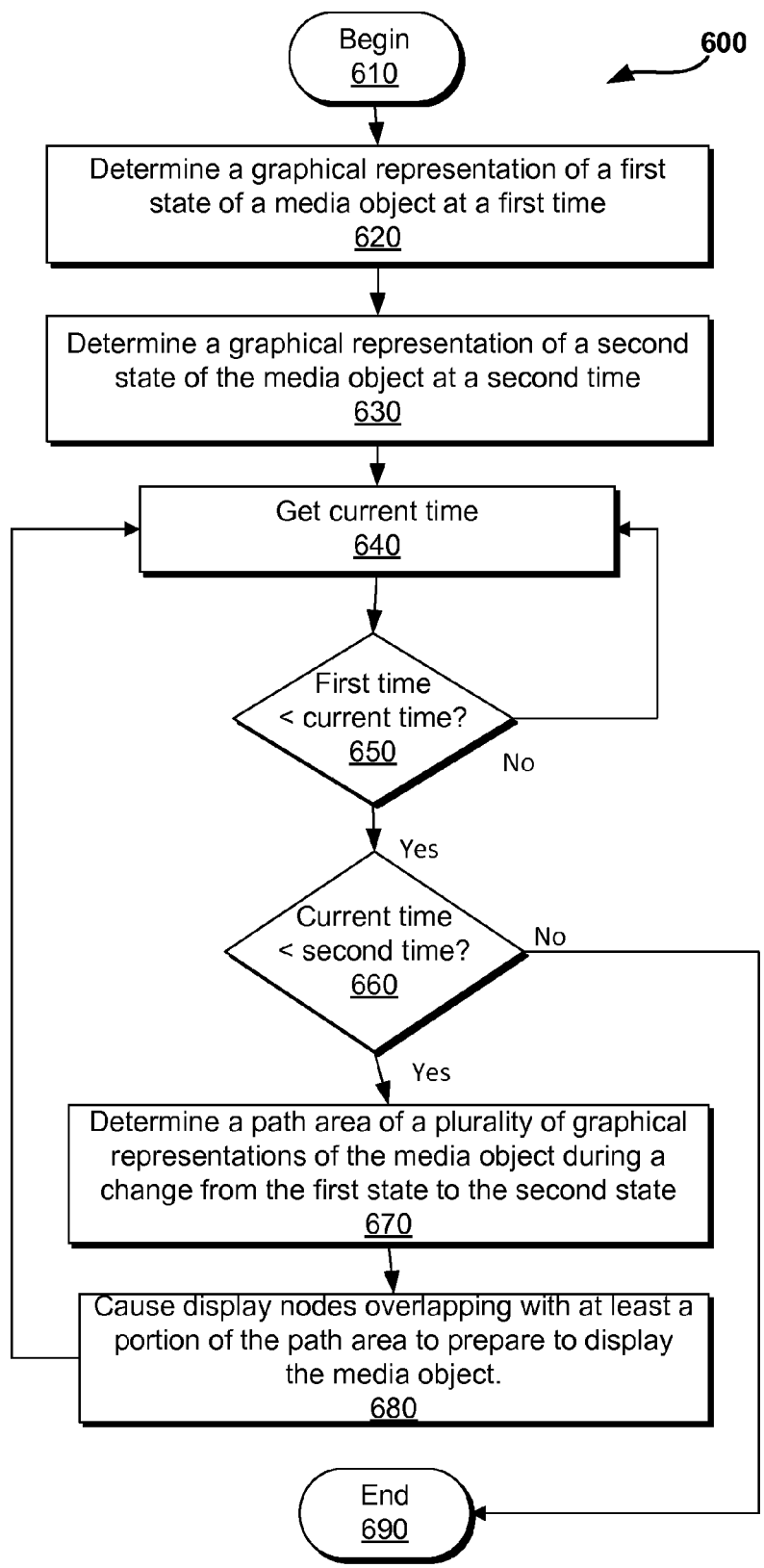
FIG. 11 is a flow chart illustrating an embodiment of a method that can be practiced by a control node for animating a media object on an array display.

FIG. 11 schematically illustrates an embodiment of another method 600 of animating images on a tiled display system, such as the array 100. The method illustrated in FIG. 11, as well as the other methods disclosed below, can be stored as process instructions (for example on any type of computer-readable storage medium) accessible by the image processing module 150 and/or other components of the display node 100A, the control node 102, or any other computer or system connected to the array 100 directly or over any type of network. In some embodiments, the method illustrated in FIG. 11 is performed by a control node 102. Depending on the embodiment, certain of the blocks described below may be removed, others may be added, and the sequence of the blocks may be altered. The blocks of the methods and algorithms described in connection with the embodiments disclosed herein can be embodied directly in hardware, in a software module executed by a processor, or in a combination of the two.

Beginning in block 610 and proceeding to block 620, the method includes determining a graphical representation of a first state of a media object at a first time. For example, the first state can comprise a graphical representation of the media object on at least one of the plurality of discrete display nodes. Moving to block 630, a graphical representation of a second state of the media object at a second time can be determined. For example, the second state can comprise a graphical representation of the media object on at least one of the plurality of discrete display nodes.

At block 640, the current time can be obtained. Moving on to block 650, the current time is compared to the first time. If the first time is not before the current time, the animation sequence has not yet begun, and the routine returns to block 640. After the current time is at or after the first time, the method continues to block 660. If the current time is before the second time, a path area of a plurality of graphical representations of the media object during a change from the first state to the second state is determined at block 670. Next, at block 680, each of the plurality of discrete display devices overlapping with at least a portion of the path area determined in 670 can be caused to prepare to display the media object. For example, each of the plurality of discrete display devices overlapping with at least a portion of the path area can begin to load the media object. The routine then loops back to block 640 to obtain the current time. If at block 660 the current time is beyond the second time, the media object is in the second state, and the routine ends at 690.

Figure 12:
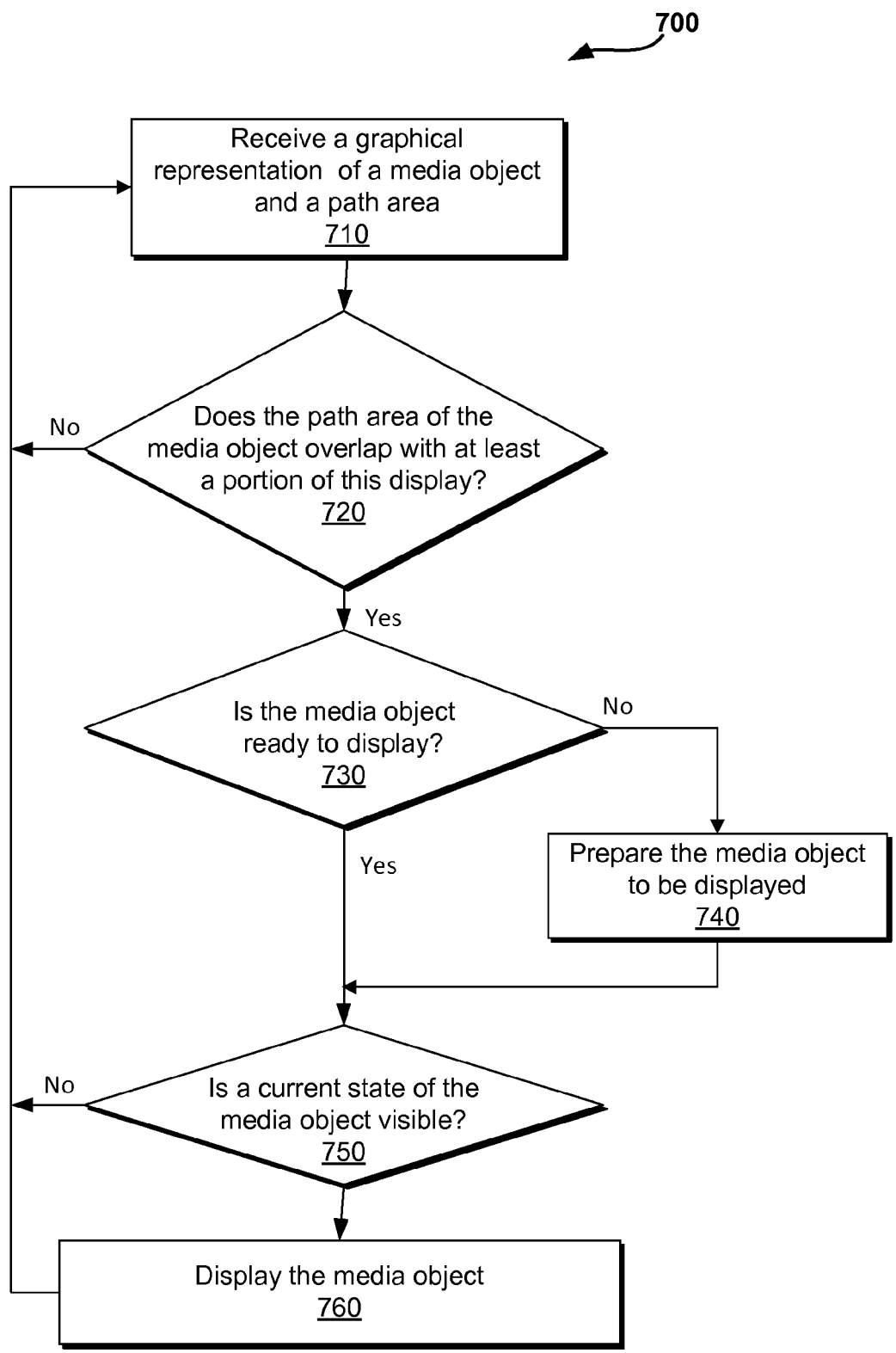
FIG. 12 is a flow chart illustrating an embodiment of a method that can be practiced by a display node for animating a media object on an array display.

FIG. 12 schematically illustrates an embodiment of another method 700 of animating images on a tiled display system, such as the array 100. The method illustrated in FIG. 12, as well as the other methods disclosed below, can be stored as process instructions (for example on any type of computer-readable storage medium) accessible by the image processing module 150 and/or other components of the display node 100A, the control node 102, or any other computer or system connected to the array 100 directly or over any type of network. In some embodiments, the method illustrated in FIG. 12 is performed by a display node 100A. Depending on the embodiment, certain of the blocks described below may be removed, others may be added, and the sequence of the blocks may be altered. The blocks of the methods and algorithms described in connection with the embodiments disclosed herein can be embodied directly in hardware, in a software module executed by a processor, or in a combination of the two.

Beginning in block 710, a graphical representation of a media object and a path area are received. Proceeding to block 720, a display node can determine whether the path area of the media object overlaps with at least a portion of the display node. If not, the display node does not need to display the media object, and the routine can return to block 710. If the answer in block 720 is yes, the display node needs to display the media object. Proceeding to block 730, the display node determines whether the media object is ready for display. If yes, the display node can proceed to block 750. If not, the display node can proceed to block 740 and prepare the media object to be displayed by loading the media object. At block 750, the display node can determine whether a current state of the media object is visible. If yes, the display node can proceed to block 760 and display the media object. If not, the method can loop back to step 710 and go through the previous steps until it is time for the display node to display the media object.

In addition the types of connections and couplings discussed above, any coupling or connection discussed herein could be a local area network, wireless local area network, wide area network, metropolitan area network, storage area network, system area network, server area network, small area network, campus area network, controller area network, cluster area network, personal area network, desk area network or any other type of network.

Any of the computers, laptops, server, including the proxy server, control nodes, workstation, or other devices herein may be any type of computer system. A computer system may include a bus or other communication mechanism for communicating information, and a processor coupled with bus for processing information. Computer system may also includes a main memory, such as a random access memory (RAM), flash memory, or other dynamic storage device, coupled to bus for storing information and instructions to be executed by processor. Main memory also may be used for storing temporary variables or other intermediate information during execution of instructions to be executed by processor. Computer system may further include a read only memory (ROM) or other static storage device coupled to a bus for storing static information and instructions for processor. A storage device, such as a magnetic disk, flash memory or optical disk, may be provided and coupled to bus for storing information and instructions.

The embodiments herein are related to the use of computer system for the techniques and functions described herein in a network system. In some embodiments, such techniques and functions are provided by a computer system in response to processor executing one or more sequences of one or more instructions contained in main memory. Such instructions may be read into main memory from another computer-readable storage medium, such as storage device. Execution of the sequences of instructions contained in main memory may cause a processor to perform the process steps described herein. In alternative embodiments, hard-wired circuitry may be used in place of or in combination with software instructions to implement embodiments. Thus, embodiments are not limited to any specific combination of hardware circuitry and software.

The term "computer-readable storage medium" as used herein, in addition to having its ordinary meaning, refers to any medium that participates in providing instructions to a processor for execution. Such a medium may take many forms, including but not limited to, non-volatile media and volatile media. Non-volatile media includes, for example, optical or magnetic disks, such as a storage device. Volatile media includes dynamic memory, such as main memory. Transmission media includes coaxial cables, copper wire and fiber optics, including the wires that comprise a bus.

Common forms of computer-readable media include, for example, a floppy disk, a flexible disk, hard disk, magnetic tape, or any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge.

Computer systems can send messages and receive data, including program code, through the networks or other couplings. The received code may be executed by a processor as it is received, and/or stored in storage device, or other non-volatile storage for later execution.

In general, the word "module," as used herein, refers to logic embodied in hardware or firmware, or to a collection of software instructions, possibly having entry and exit points, written in a programming language, such as, for example, Java, Lua, Objective-C, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware, or combinations of software, hardware and/or firmware. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure. Generally, the modules described herein refer to logical modules that may be combined with other modules or divided into sub-modules despite their physical organization or storage.

Each of the processes, components, and algorithms described above can be embodied in, and fully automated by, modules executed by one or more computers or computer processors. The modules can be stored on any type of computer-readable medium or computer storage device. The processes and algorithms can also be implemented partially or wholly in application-specific circuitry. The results of the disclosed processes and process steps can be stored, persistently or otherwise, in any type of computer storage. In addition, the modules can comprise, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, variables, or the like.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Although the foregoing description includes certain embodiments, other embodiments will be apparent to those of ordinary skill in the art from the disclosure herein. Moreover, the described embodiments have been presented by way of example only, and are not intended to limit the scope of the inventions. Indeed, the novel methods and systems described herein may be embodied in a variety of other forms without departing from the spirit thereof. Accordingly, other combinations, omissions, substitutions and modifications will be apparent to the skilled artisan in view of the disclosure herein. Thus, the present inventions are not intended to be limited by the disclosed embodiments.

What is claimed is:

1. A display system comprising:
 a plurality of discrete display devices disposed in proximity to one another, wherein each discrete display device comprises a separate processor and memory; and
 a computing device comprising a second processor, the computing device configured to determine a graphical representation of a media object in a current state and cause the graphical representation of the media object in the current state to be displayed on a first discrete display device in the plurality of discrete display devices at a first time;

the computing device further configured to determine a path of the media object as the media object transitions from the current state to a future state, wherein the path overlaps at least a portion of a second discrete display device in the plurality of discrete display devices;

the computing device further configured to determine that the graphical representation of the media object in the future state should be displayed by the second discrete display device at a second time after the first time based on the determined path, wherein a difference between the second time and the first time is greater than a loading delay of the media object, and wherein the loading delay is determined based on a media object type and a type of source from which the media object is retrieved;

the computing device further configured to cause the second discrete display device to load the graphical representation of the media object in the future state at the first time for display on the second discrete display device at the second time.

2. The display system according to claim 1, wherein a change of the graphical representation of the media object from the current state to the future state comprises a change in at least one of a position, a size, or a rotation of the graphical representation of the media object.

3. The display system according to claim 1, wherein the second discrete display device is disposed adjacent to the first discrete display device, and wherein the path is a path area that overlaps with at least a fractional portion of at least one of the first and second discrete display devices.

4. The display system according to claim 1, wherein the second time is at a predetermined fixed time beyond the first time.

5. The display system according to claim 1, wherein the path comprises a rectangular area bounded by a top, left, bottom, and right point on at least one of the first discrete display device or the second discrete display device, the top point being the point furthest to the top on at least one of the first or second discrete display devices comprising any graphical representation of the media object during a change from the current state to the future state, the left point being the point furthest to the left on at least one of the first or second discrete display devices comprising any graphical representation of the media object during the change from the current state to the future state, the bottom point being the point furthest to the bottom on at least one of the first or second discrete display devices comprising any graphical representation of the media object during the change from the current state to the future state, and the right point being the point furthest to the right on at least one of the first or second discrete display devices comprising any graphical representation of the media object during the change from the current state to the future state.

6. The display system according to claim 1, wherein the computing device is further configured to allow a user to define a change from the current state to the future state.

7. The system according to claim 1, wherein the computing device is coupled to each of the plurality of discrete display devices, the computing device comprising an additional discrete display device, the computing device being configured to display a representation of an array of the plurality of discrete display devices and the graphical representation of the media object.

8. The system according to claim 1, wherein at least one of the plurality of discrete display devices comprises the computing device.

9. A method of displaying a media object on an arrayed display system including a plurality of discrete display devices disposed adjacent one another, each discrete display device comprising a separate processor and memory, the method comprising:

determining, by a computing device comprising a second processor, a graphical representation of the media object in a current state and causing the graphical representation of the media object in the current state to be displayed on a first discrete display device in the plurality of discrete display devices at a first time;

determining, by the computing device, a path of the media object as the media object transitions from the current state to a future state, wherein the path overlaps at least a portion of a second discrete display device in the plurality of discrete display devices;

determining, by the computing device, that the graphical representation of the media object in the future state should be displayed by the second discrete display device at a second time after the first time based on the determined path, wherein a difference between the second time and the first time is greater than a loading delay of the media object, and wherein the loading delay is determined based on a media object type and a type of source from which the media object is retrieved; and instructing, by the computing device, the second discrete display device to load the graphical representation of the media object in the future state at the first time for display on the second discrete display device at the second time.

10. The method according to claim 9, wherein a change of the graphical representation of the media object from the current state to the future state comprises a change in at least one of a position, a size, or a rotation of the graphical representation of the media object.

11. The method according to claim 9, wherein the second discrete display device is disposed adjacent to the first discrete display device, and wherein the path is an area that overlaps with at least a fractional portion of at least one of the first and second discrete display devices.

12. The method according to claim 9, wherein the second time is at a predetermined fixed time beyond the first time.

13. The method according to claim 9, wherein the path comprises a rectangular area bounded by a top, left, bottom, and right point on at least one of the first discrete display device or the second discrete display device, the top point being the point furthest to the top on at least one of the first or second discrete display devices comprising any graphical representation of the media object during a change from the current state to the future state, the left point being the point furthest to the left on at least one of the first or second discrete display devices comprising any graphical representation of the media object during the change from the current state to the future state, the bottom point being the point furthest to the bottom on at least one of the first or second discrete display devices comprising any graphical representation of the media object during the change from the current state to the future state, and the right point being the point furthest to the right on at least one of the first or second discrete display devices comprising any graphical representation of the media object during the change from the current state to the future state.

14. The method according to claim 9, further comprising receiving the future state of the media object from a user.

15. A computer program stored in a non-transitory computer readable media, the program, when executed by a computer, causing the computer to:
  determine a graphical representation of the media object in a current state and causing the graphical representation of the media object in the current state to be displayed on a first discrete display device in a plurality of discrete display devices at a first time, wherein the plurality of discrete display devices are disposed in proximity to one another and each comprise a separate processor and memory;
  determine a path of the media object as the media object transitions from the current state to a future state, wherein the path overlaps at least a portion of a second discrete display device in the plurality of discrete display devices;
  determine that the graphical representation of the media object in the future state should be displayed by the second discrete display device at a second time after the first time based on the determined path, wherein a difference between the second time and the first time is greater than a loading delay of the media object, and wherein the loading delay is determined based on a media object type and a type of source from which the media object is retrieved; and
  instruct the second discrete display device to load the graphical representation of the media object in the future state at the first time for display on the second discrete display device at the second time.

16. The computer program according to claim 15, wherein a change of the graphical representation of the media object from the current state to the future state comprises a change in at least one of a position, a size, or a rotation of the graphical representation of the media object.

17. The computer program according to claim 15, wherein the second discrete display device is disposed adjacent to the first discrete display device, and wherein the path is a path area that overlaps with at least a fractional portion of at least one of the first and second discrete display devices.

18. The computer program according to claim 15, wherein the second time is at a predetermined fixed time beyond the first time.

19. The computer program according to claim 15, wherein the path comprises a rectangular area bounded by a top, left, bottom, and right point on at least one of the first discrete display device or the second discrete display device, the top point being the point furthest to the top on at least one of the first and second discrete display devices comprising any graphical representation of the media object during a change from the current state to the future state, the left point being the point furthest to the left on at least one of the first or second discrete display devices comprising any graphical representation of the media object during the change from the current state to the future state, the bottom point being the point furthest to the bottom on at least one of the first or second discrete display devices comprising any graphical representation of the media object during the change from the current state to the future state, and the right point being the point furthest to the right on at least one of the first and second discrete display devices comprising any graphical representation of the media object during the change from the current state to the future state.

20. The display system according to claim 1, wherein the second time is at least two seconds after the first time.

* * * * *